(12) United States Patent
Cho et al.

(10) Patent No.: US 9,424,053 B2
(45) Date of Patent: Aug. 23, 2016

(54) METHOD AND APPARATUS FOR DISPLAYING PERSONALIZED USER INTERFACE

(75) Inventors: Seong-ho Cho, Seoul (KR); Young-sun Ryu, Seongnam-si (KR); Kyung-mo Park, Seoul (KR); Ho-yeon Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 535 days.

(21) Appl. No.: 12/385,317

(22) Filed: Apr. 3, 2009

(65) Prior Publication Data

US 2009/0265646 A1    Oct. 22, 2009

Related U.S. Application Data

(60) Provisional application No. 61/045,787, filed on Apr. 17, 2008.

(30) Foreign Application Priority Data

Aug. 12, 2008 (KR) ......................... 10-2008-0079036

(51) Int. Cl.
| | |
|---|---|
| *G06F 3/048* | (2013.01) |
| *G06F 9/44* | (2006.01) |
| *G06F 3/0481* | (2013.01) |
| *H04N 1/00* | (2006.01) |

(52) U.S. Cl.
CPC ........... *G06F 9/4445* (2013.01); *G06F 3/0481* (2013.01); *H04N 1/00501* (2013.01)

(58) Field of Classification Search
CPC .......................... G06F 3/0481; H04N 1/00501

USPC ......................... 715/744, 788, 825
See application file for complete search history.

(56) References Cited

U.S. PATENT DOCUMENTS

| | | | |
|---|---|---|---|
| 6,091,411 A * | 7/2000 | Straub et al. ................. | 715/747 |
| 6,452,616 B1 | 9/2002 | De Vito et al. | |
| 6,476,828 B1 | 11/2002 | Burkett et al. | |
| 6,751,623 B1 | 6/2004 | Basso et al. | |
| 6,895,430 B1 | 5/2005 | Schneider | |
| 7,197,715 B1 * | 3/2007 | Valeria .......................... | 715/747 |
| 7,212,212 B2 * | 5/2007 | Cherdron ............... | G06Q 10/06 345/581 |
| 7,257,775 B1 * | 8/2007 | Jivakov et al. ............... | 715/742 |
| 7,346,689 B1 | 3/2008 | Northcutt et al. | |

(Continued)

FOREIGN PATENT DOCUMENTS

| | | |
|---|---|---|
| CN | 1770721 | 5/2006 |
| CN | 1961281 | 5/2007 |

(Continued)

OTHER PUBLICATIONS

International Search Report dated Dec. 4, 2010 and issued in corresponding International Patent Application PCT/KR2009/001995.

(Continued)

*Primary Examiner* — Ryan Pitaro
(74) *Attorney, Agent, or Firm* — Staas & Halsey LLP

(57) ABSTRACT

A method of displaying a user interface (UI), wherein the displaying is performed by a client, is provided. The method includes receiving UI data from a server, generating the UI to be displayed based on the received UI data and characteristics of the client and displaying the generated UI.

18 Claims, 6 Drawing Sheets

(56) References Cited

U.S. PATENT DOCUMENTS

| | | | |
|---|---|---|---|
| 7,350,138 B1* | 3/2008 | Swaminathan et al. | 715/234 |
| 7,356,569 B1 | 4/2008 | Kembel | |
| 7,360,152 B2* | 4/2008 | Capps | H04N 21/40 348/E5.002 |
| 7,529,370 B1* | 5/2009 | Zhang et al. | 380/231 |
| 7,536,647 B2* | 5/2009 | Walker et al. | 715/748 |
| 7,546,522 B2* | 6/2009 | Tolle et al. | 715/215 |
| 7,571,425 B2* | 8/2009 | Lessly | G06F 8/38 717/104 |
| 7,590,947 B1* | 9/2009 | Gay et al. | G06F 3/0483 715/798 |
| 7,644,367 B2 | 1/2010 | McKeon et al. | |
| 7,660,416 B1* | 2/2010 | Kline | 380/216 |
| 7,734,999 B2* | 6/2010 | Leung et al. | 715/222 |
| 7,818,658 B2* | 10/2010 | Chen | 715/201 |
| 7,827,496 B2 | 11/2010 | Dorn et al. | |
| 7,869,068 B2* | 1/2011 | Foehr et al. | 358/1.15 |
| 7,934,159 B1* | 4/2011 | Rahman et al. | 715/716 |
| 8,244,796 B1 | 8/2012 | James | |
| 8,285,901 B2* | 10/2012 | Schubert et al. | 710/105 |
| 2001/0051998 A1 | 12/2001 | Henderson | |
| 2002/0029296 A1 | 3/2002 | Anuff | |
| 2002/0054165 A1 | 5/2002 | Negishi et al. | |
| 2002/0059559 A1 | 5/2002 | Reddy | |
| 2002/0070978 A1* | 6/2002 | Wishoff et al. | 345/811 |
| 2002/0105539 A1 | 8/2002 | Gamzon | |
| 2002/0109718 A1 | 8/2002 | Mansour et al. | |
| 2002/0111995 A1 | 8/2002 | Mansour | |
| 2002/0112058 A1 | 8/2002 | Weisman et al. | |
| 2002/0116708 A1* | 8/2002 | Morris et al. | 725/37 |
| 2002/0120679 A1 | 8/2002 | Hayton | |
| 2002/0186664 A1 | 12/2002 | Gibson et al. | |
| 2002/0191950 A1* | 12/2002 | Wang | 386/46 |
| 2002/0196912 A1* | 12/2002 | Norris | 379/88.17 |
| 2003/0001897 A1* | 1/2003 | Meandzija et al. | 345/772 |
| 2003/0004897 A1 | 1/2003 | Smith, IV | |
| 2003/0030674 A1 | 2/2003 | Johnstone | |
| 2003/0117365 A1 | 6/2003 | Shteyn | |
| 2003/0151621 A1 | 8/2003 | McEvilly et al. | |
| 2003/0195923 A1 | 10/2003 | Bloch | |
| 2004/0001565 A1 | 1/2004 | Jones | |
| 2004/0015981 A1 | 1/2004 | Coker | |
| 2004/0066397 A1* | 4/2004 | Walker et al. | 345/719 |
| 2004/0148586 A1 | 7/2004 | Gilboa | |
| 2004/0163046 A1 | 8/2004 | Chu | |
| 2004/0193652 A1 | 9/2004 | Wendker | |
| 2005/0010634 A1 | 1/2005 | Henderson | |
| 2005/0010877 A1* | 1/2005 | Udler | 715/826 |
| 2005/0091584 A1* | 4/2005 | Bogdan | G06F 3/04817 715/236 |
| 2005/0101312 A1 | 5/2005 | Kang | |
| 2005/0125560 A1 | 6/2005 | Brockway | |
| 2005/0131911 A1 | 6/2005 | Chi | |
| 2005/0149639 A1 | 7/2005 | Vrielink et al. | |
| 2005/0192771 A1 | 9/2005 | Fischer | |
| 2005/0256940 A1 | 11/2005 | Henderson | |
| 2005/0257137 A1 | 11/2005 | Weber et al. | |
| 2005/0267973 A1 | 12/2005 | Carlson | |
| 2005/0278793 A1 | 12/2005 | Raley | |
| 2005/0283798 A1* | 12/2005 | Hunleth et al. | 725/37 |
| 2006/0041641 A1 | 2/2006 | Breiter | |
| 2006/0094360 A1 | 5/2006 | Jung et al. | |
| 2006/0156315 A1 | 7/2006 | Wood | |
| 2006/0174026 A1 | 8/2006 | Robinson et al. | |
| 2006/0182092 A1 | 8/2006 | Kodaka | |
| 2006/0212798 A1 | 9/2006 | Lection | |
| 2006/0232573 A1 | 10/2006 | Nitta et al. | |
| 2006/0236234 A1* | 10/2006 | Michelstein et al. | 715/523 |
| 2007/0033522 A1 | 2/2007 | Lin | |
| 2007/0150816 A1* | 6/2007 | Hariki | 715/733 |
| 2007/0214431 A1* | 9/2007 | Amadio et al. | 715/788 |
| 2007/0220392 A1 | 9/2007 | Bhaumik et al. | |
| 2007/0282748 A1 | 12/2007 | Saint Clair et al. | |
| 2007/0288636 A1 | 12/2007 | Rogers | |
| 2007/0294586 A1 | 12/2007 | Parvathy et al. | |
| 2007/0294674 A1* | 12/2007 | Marilly et al. | 717/136 |
| 2008/0016151 A1 | 1/2008 | Howard | |
| 2008/0034289 A1 | 2/2008 | Doepke | |
| 2008/0082603 A1 | 4/2008 | Mansour et al. | |
| 2008/0122847 A1 | 5/2008 | Takano et al. | |
| 2008/0127060 A1 | 5/2008 | Reamey | |
| 2008/0127133 A1 | 5/2008 | Aghara | |
| 2008/0155062 A1 | 6/2008 | Rabold et al. | |
| 2008/0155617 A1* | 6/2008 | Angiolillo et al. | 725/93 |
| 2008/0193109 A1* | 8/2008 | Kakumu et al. | 386/126 |
| 2008/0212937 A1* | 9/2008 | Son | 386/83 |
| 2008/0240669 A1 | 10/2008 | Oh et al. | |
| 2008/0243998 A1 | 10/2008 | Oh et al. | |
| 2008/0282172 A1 | 11/2008 | Bayang | |
| 2008/0285949 A1 | 11/2008 | Weber | |
| 2008/0288866 A1* | 11/2008 | Spencer et al. | 715/716 |
| 2008/0301628 A1 | 12/2008 | Lochmann | |
| 2008/0313648 A1 | 12/2008 | Wang | |
| 2009/0006979 A1 | 1/2009 | Callanan et al. | |
| 2009/0006985 A1 | 1/2009 | Fong | |
| 2009/0037396 A1 | 2/2009 | Uematsu et al. | |
| 2009/0125582 A1 | 5/2009 | Marcus | |
| 2009/0144640 A1 | 6/2009 | Schneider | |
| 2009/0204885 A1 | 8/2009 | Ellsworth et al. | |
| 2009/0265422 A1 | 10/2009 | Park et al. | |
| 2009/0300478 A1 | 12/2009 | Kondo | |
| 2010/0023865 A1 | 1/2010 | Fulker et al. | |
| 2010/0042678 A1 | 2/2010 | Park et al. | |
| 2010/0058220 A1* | 3/2010 | Carpenter | 715/772 |
| 2010/0086022 A1 | 4/2010 | Hunleth et al. | |
| 2010/0241963 A1* | 9/2010 | Kulis et al. | 715/727 |
| 2010/0281545 A1* | 11/2010 | Levy | 726/30 |
| 2010/0295770 A1 | 11/2010 | Shim | |
| 2010/0332565 A1* | 12/2010 | Al-Shaykh et al. | 707/912 |
| 2010/0332993 A1* | 12/2010 | Bousseton et al. | 715/738 |
| 2011/0072374 A1* | 3/2011 | Kunz et al. | 715/765 |
| 2011/0202842 A1* | 8/2011 | Weatherly et al. | 715/716 |
| 2011/0289412 A1* | 11/2011 | Sokol et al. | 715/720 |
| 2012/0054602 A1* | 3/2012 | Demant et al. | 715/247 |
| 2012/0204115 A1 | 8/2012 | Barrett | |

FOREIGN PATENT DOCUMENTS

| | | |
|---|---|---|
| EP | 1187000 | 3/2002 |
| EP | 1253750 | 10/2002 |
| EP | 2 143 297 | 1/2010 |
| KR | 2002-0048188 | 6/2002 |
| KR | 2003-0071289 | 9/2003 |
| KR | 10-2005-0072069 | 7/2005 |
| KR | 10-2006-0001550 | 1/2006 |
| KR | 10-2006-0105813 | 10/2006 |
| KR | 10-2007-0005987 | 1/2007 |
| KR | 10-2007-0074037 | 7/2007 |
| KR | 10-2008-0018061 | 2/2008 |
| KR | 10-2008-0089119 | 10/2008 |
| KR | 10-2008-0089134 | 10/2008 |
| KR | 10-2010-0020310 | 2/2010 |
| WO | 02/082814 A2 | 10/2002 |
| WO | 2008/023940 A1 | 2/2008 |
| WO | 2008/120890 A1 | 10/2008 |

OTHER PUBLICATIONS

European Search Report dated May 2, 2011 in corresponding European Patent Application 09732983.3.
International Search Report issued Dec. 7, 2009 in corresponding International Patent Application PCT/KR2009/001952.
International Search Report issued Nov. 27, 2009 in corresponding International Patent Application PCT/KR2009/001994.
Chinese Office Action for related Chinese Patent Application No. 200980113575.1, mailed on Apr. 18, 2012.
Chinese Office Action for related Chinese Patent Application No. 200980113927.3, mailed on Feb. 13, 2012.
Chinese Office Action for related Chinese Patent Application No. 200980113591.0, mailed on Feb. 6, 2012.
Extended European Search Report issued Dec. 6, 2012 in corresponding European Patent Application No. 09731533.7.

(56) References Cited

OTHER PUBLICATIONS

Extended European Search Report issued Dec. 12, 2012 in corresponding European Patent Application No. 09731966.9.
Extended European Search Report issued Dec. 14, 2012 in corresponding European Patent Application No. 09732302.6.
Second Chinese Office Action issued Nov. 19, 2012 in corresponding Chinese Patent Application No. 200980113575.1.
Third Chinese Office Action issued Oct. 26, 2012 in corresponding Chinese Patent Application No. 200980113591.0.
Third Chinese Office Action issued Oct. 26, 2012 in corresponding Chinese Patent Application No. 200980113927.3.
"Web-based Protocol and Framework for Remote User Interface on UPnP Networks and the Internet (Web4CE)", CEA Standard, Jul. 2007, 176 pages.
Fourth Chinese Office Action issued Feb. 5, 2013 in corresponding Chinese Patent Application 200980113591.0.
Chinese Decision of Rejection issued Mar. 7, 2013 in corresponding Chinese Patent Application 200980113927.3.
Chinese Office Action issued Nov. 8, 2013 in Chinese Patent Application No. 200980113575.1.
Chinese Office Action issued Aug. 22, 2013 in Chinese Patent Application No. 200980113591.0.
Chinese Office Action issued Jul. 17, 2012 in the corresponding Chinese Patent Application No. 200980113591.0.
Chinese Office Action issued May 16, 2013 in corresponding Chinese Patent Application No. 200980113575.1.
Korean Office Action issued Dec. 30, 2014 in Korean Patent Application No. 10-2008-0079032.
Chinese Office Action dated Sep. 7, 2015 in Chinese Patent Application No. 200980113927.3.
Chinese Office Action dated Dec. 22, 2015 in Chinese Patent Application No. 200980113591.0.
US Notice of Allowance issued Mar. 9, 2016 in U.S. Appl. No. 12/382,361.
KyungMo Stanley Park, "LASeR in Home" International Organisation for Standardisation, ISO/IEC JTC1/SC29/WG11, Coding of Moving Pictures and Audio, Apr. 2008, 4 pages.
KyungMo Stanley Park, "Use cases and requirement for an MPEG User Interface Framework" International Organisation for Standardisation, ISO/IEC JTC1/SC29/WG11, Coding of Moving Pictures and Audio, Apr. 2008, 6 pages.
Seongho Cho, "Use cases and requirement of a personalized User Interface for LASeR" International Organisation for Standardisation, ISO/IEC JTC1/SC29/WG11, Coding of Moving Pictures and Audio, Apr. 2008, 3 pages.
Korean Office Action dated Dec. 30, 2014 from Korean Patent Application No. 10-2008-0079032, 10 pages.
Korean Office Action dated Jan. 19, 2015 from Korean Patent Application No. 10-2008-0079036, 12 pages.
Verhoeven, R.; Dees, W., "Defining services for mobile terminals using remote user interfaces," Consumer Electronics, IEEE Transactions on , vol. 50, No. 2, pp. 535-542, May 2004.
Lowet et al. "Content Sharing and Experience Sharing with Web4CE." Philips Research Laboratories, Mar. 2008.
International Search Report issued Dec. 9, 2009 in corresponding International Patent Application PCT/KR2009/001951.
US Notice of Allowance dated Oct. 28, 2015 in U.S. Appl. No. 12/382,361.
US Office Action dated May 16, 2014 in U.S. Appl. No. 12/382,361.
US Office Action dated Oct. 2, 2014 in U.S. Appl. No. 12/382,361.
US Advisory Action dated Dec. 10, 2014 in U.S. Appl. No. 12/382,361.
US Office Action dated Apr. 12, 2012 in U.S. Appl. No. 12/382,361.
US Office Action dated Jan. 5, 2012 in U.S. Appl. No. 12/382,361.
US Office Action dated Jun. 15, 2011 in U.S. Appl. No. 12/382,361.
US Office Action dated Jan. 12, 2015 in U.S. Appl. No. 12/382,362.
US Office Action dated May 22, 2014 in U.S. Appl. No. 12/382,362.
US Office Action dated Aug. 4, 2014 in U.S. Appl. No. 12/382,362.
US Office Action dated Mar. 21, 2013 in U.S. Appl. No. 12/382,362.
US Office Action dated Nov. 6, 2013 in U.S. Appl. No. 12/382,362.
US Office Action dated Oct. 24, 2012 in U.S. Appl. No. 12/382,362.
US Office Action dated Apr. 15, 2011 in U.S. Appl. No. 12/382,362.
US Office Action dated Oct. 21, 2011 in U.S. Appl. No. 12/382,362.
US Notice of Allowance dated Mar. 13, 2015 in U.S. Appl. No. 12/423,992.
US Office Action dated May 16, 2014 in U.S. Appl. No. 12/423,992.
US Office Action dated Oct. 1, 2014 in U.S. Appl. No. 12/423,992.
Advisory Action dated Apr. 12, 2013 in U.S. Appl. No. 12/423,992.
US Office Action dated Jan. 30, 2013 in U.S. Appl. No. 12/423,992US.
US Office Action dated Oct. 2, 2012 in U.S. Appl. No. 12/423,992.
US Office Action dated Jan. 24, 2011 in U.S. Appl. No. 12/423,992.
US Office Action dated Aug. 31, 2011 in U.S. Appl. No. 12/423,992.
US Advisory Action dated Dec. 7, 2011 in U.S. Appl. No. 12/423,992.
Chinese Office Action dated Apr. 29, 2016 in Chinese Patent Application No. 200980113591.0.
Chinese Office Action dated Apr. 11, 2016 in Chinese Patent Application No. 200980113927.3.

* cited by examiner

METHOD AND APPARATUS FOR DISPLAYING PERSONALIZED USER INTERFACE

CROSS-REFERENCE TO RELATED APPLICATIONS

This application claims the benefit of U.S. Provisional Patent Application No. 61/045,787, filed on Apr. 17, 2008, in the United States Patent and Trademark Office, and Korean Patent Application No. 10-2008-0079036, filed on Aug. 12, 2008, in the Korean Intellectual Property Office, the disclosure of which is incorporated herein in its entirety by reference.

BACKGROUND

1. Field

Embodiments described herein relate to a method and apparatus for displaying a user interface (UI), wherein the displaying is performed by a client, and more particularly, to a method and apparatus for displaying a UI after a client receives UI data from a remote server.

2. Description of the Related Art

A variety of types of multimedia devices have been developed and an accelerated convergence of the multimedia devices has occurred. Different types of multimedia devices are frequently used to configure a network and communicate multimedia data, or control each other.

Multimedia devices that are physically far apart from each other are remotely controlled via a remote user interface (RUI). A UI server provides a UI for controlling a UI client and the UI client controls the UI server through the provided UI. For example, in providing/receiving a UI according to the CEA-2014 standard, the UI server provides the UI for remote control to the UI client in a web page format and the UI client displays the web page to a user using a web browser. Then, the user of the client uses the displayed UI and controls the UI server.

SUMMARY

Embodiments of the present invention provide a method and apparatus for displaying a user interface (UI) provided from a remote server, wherein the displaying is performed by a client, and a computer readable recording medium having recorded thereto a program causing a computer to execute the method.

According to an aspect of embodiments of the present invention, there is provided a method of displaying a user interface (UI), wherein the displaying is performed by a client, the method including receiving UI data from a server, generating the UI to be displayed based on the received UI data and characteristics of the client, and displaying the generated UI.

The UI data may be encoded in a multimedia data format using a scene-description technology based on a Moving Picture Experts Group (MPEG) standard.

The UI data may include information about a dynamic configuration of the UI.

The generating of the UI to be displayed may include comparing the characteristics of the client against the information about the dynamic configuration of the UI.

The UI data may include data for a plurality of UI objects.

Each one of the plurality of UI objects may be a minimum unit of the UI in which a predetermined event is generated from interaction with a user.

The information about the dynamic configuration of the UI may be used in the generating of the UI by changing at least one of a color, a form, a background image, and a font of the UI.

The information about the dynamic configuration of the UI may include representation information indicating how the UI objects are to be arranged in the UI.

The generating of the UI to be displayed may include selecting at least one of the plurality of UI objects based on the characteristics of the client.

The characteristics of the client may comprise at least one of a performance of the client, a user profile of the client, a network type to which the client is connected, and external information.

The external information may be information received from external servers including weather information servers.

According to another aspect of embodiments of the present invention, there is provided a method of providing a user interface (UI) from a server to a client, the method including generating UI data comprising information about a dynamic configuration of the UI, and transmitting the generated UI data to the client, wherein the client generates the UI based on the information about the dynamic configuration of the UI and characteristics of the client.

According to another aspect of embodiments of the present invention, there is provided an apparatus for displaying a user interface (UI) of a client, the apparatus including a connection unit receiving UI data from a server, a UI generation unit generating the UI to be displayed based on the received UI data and a characteristics of the client, and a display unit displaying the generated UI.

The UI data may be based on a use pattern of UI objects by a user, indicating preferences of the user regarding the UI objects.

According to another aspect of embodiments of the present invention, there is provided an apparatus for providing a user interface (UI) to a client of a server, the apparatus including a UI data generation unit generating UI data comprising information about a dynamic configuration of the UI, and a connection unit transmitting the generated UI data to the client, wherein the client generates the UI based on the information about the dynamic configuration of the UI and characteristics of the client.

According to another aspect of embodiments of the present invention, there is provided a computer readable recording medium having embodied thereon a computer program causing a computer to execute the method of displaying a UI and the method of providing a UI from a server to a client.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
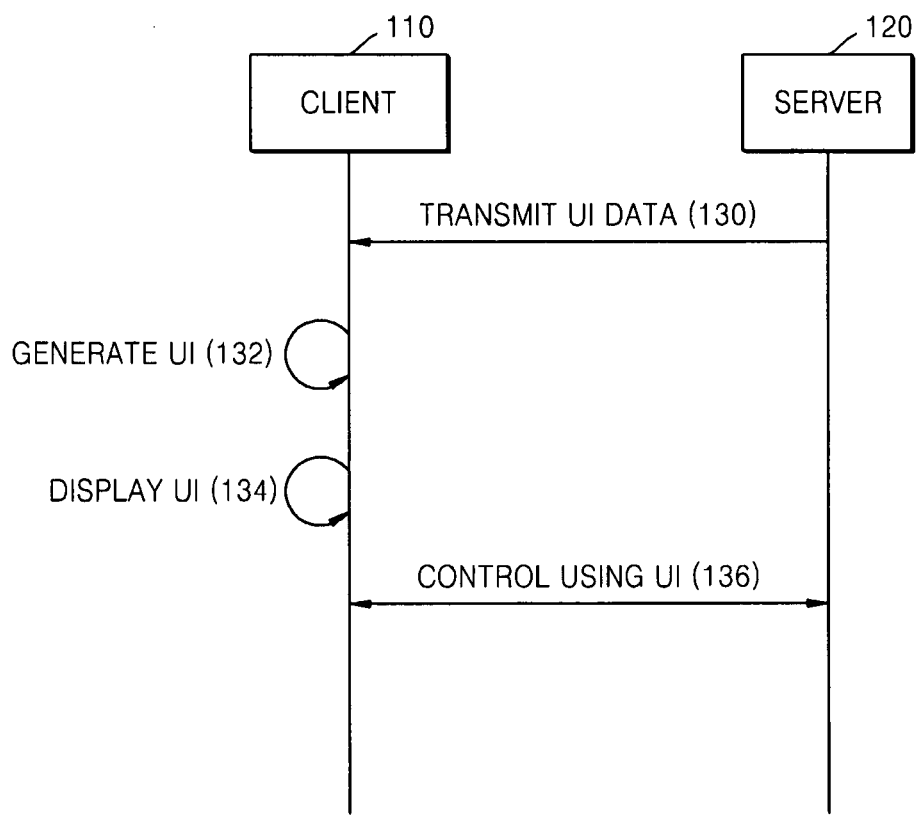
FIG. 1 illustrates a data flow diagram of a method of displaying a user interface (UI) according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a data flow diagram of a method of displaying a user interface (UI) according to an embodiment of the present invention.

Referring to FIG. 1, a client 110 is a UI client which receives UI data from a server 120, that is a remote UI server, and displays the UI 134.

In operation 130, the server 120 transmits the UI data to the client 110.

The UI data provided from the server 120 to the client 110 may be encoded in a multimedia data format according to the Moving Picture Experts Group (MPEG) standard. The MPEG standard is an international standard regarding a method of compression encoding video and audio and may include various versions such as MPEG-1, MPEG-2, MPEG-4, MPEG-7, and MPEG-21. The server 120 encodes the UI data using the MPEG standard. Most devices that are currently developed include a MPEG decoder for reproducing compressed moving picture files. Thus, when the UI is encoded based on the MPEG standard, most devices may display the UI 134 without separate applications for displaying the UI.

In particular, an object-based image encoding method such as MPEG-4 Binary Format for Scene (BIFS) or Lightweight Applications Scene Representation (LASeR) for mobile devices is used so as to encode the UI. UI objects may be image objects encoded by BIFS or LASeR and thus, a BIFS or LASeR scene-description technology is used to represent a spatio-temporal arrangement of the UI objects and the UI objects are encoded. The UI object is denoted as a minimum unit of a UI in which a predetermined event is generated according to interaction with a user and a predetermined function is called based on the generated event.

BIFS or LASeR includes information about a scene-description technology which can display the spatio-temporal arrangement of the objects included in an image. Thus, BIFS or LASeR is used to display the spatio-temporal arrangement of the UI objects such as buttons and menus.

When an image codec such as BIFS or LASeR is used to encode the UI and an MPEG-stream including the image for the UI is generated, the client 110 receives the MPEG-stream including the image for the UI encoded according to BIFS or LASeR and decodes the received MPEG-stream by using the MPEG decoder, thereby displaying the UI 134 only by reproducing the MPEG-stream. Since the UI may be displayed 134 by only reproducing the MPEG-stream, various devices including the MPEG decoder may display the UI 134 provided from the server 120.

When the UI is configured by representing the object-based arrangement using the object-based scene-description technology such as BIFS or LASeR, the client 110, which receives the UI data, may generate a dynamically personalized UI 132 by selecting and re-arranging the objects.

In encoding the UI data using the MPEG scene-description technology by the server 120, the UI data including information about the dynamic configuration of the UI may be included. The information about the dynamic configuration of the UI is information for changing at least one of a color, a form, a background image, and a font of the UI, by personalizing the UI. This is described in more detail with reference to FIG. 2.

Figure 2:
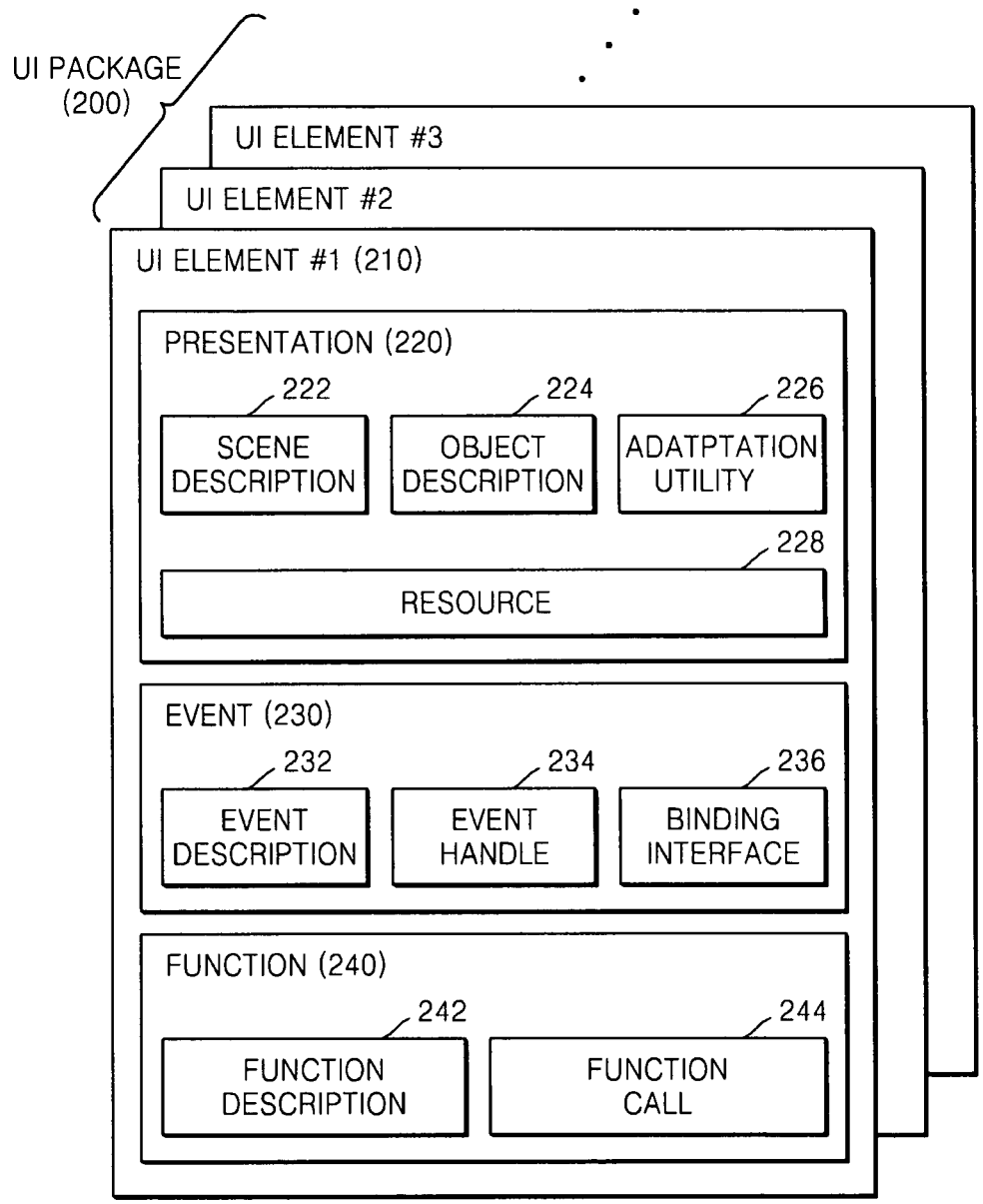
FIG. 2 illustrates UI data according to an embodiment of the present invention.

FIG. 2 illustrates UI data according to an embodiment of the present invention.

Referring to FIG. 2, the UI data may be encoded by a UI package 200. The UI package 200 includes a plurality of UI elements, including a UI Element #1 210, UI Element #2, UI Element #3, etc.

The plurality of UI elements may include information about the UIs based on characteristics of each different client. For example, with respect to the same AV control UI, UI element #1 210 may include information about a UI used by users aged in their twenties and UI element #2 may include information about a UI used by users aged in their thirties. Here, information needed to select one of the plurality of UI elements is included in each of the UI elements, as information to dynamically configure the UI. A UI element #1 210 will now be described.

The UI element #1 210 includes presentation information 220 for representing objects included in the UI, event information 230 about events generated by the objects, and function information 240 about functions called for processing the events. Information about representation, events, and function are classified into layered information and are included in UI elements so that the UI may be dynamically expanded.

The information 220 for representing the objects included in the UI indicates how the UI objects are arranged in the UI and what media is used to represent the UI objects.

A scene description 222 is information for describing a scene configuration of the UI. The scene description 222 is information about a location in which the objects are arranged in the UI and may include information for describing a layout, form, theme, and template of the scene. Information about a way of representing the UI may be also included. When the UI objects are represented using a special effect such as fade-out or fade-in, information about such a special effect may be also included. The scene description 222 may be dynamically configured according to an adaptation utility 226, which will be described later.

An object description 224 is information about a way of representing the objects included in the UI and includes information indicating what media from among an image, a picture, and audio is used to represent each of the UI objects. In addition, information about the representing time and representing ways for the objects may be also included. For example, when the objects are represented in the scene at different times, information about the time for timing control may be included. In addition, as in the scene description 222, when the UI objects are represented in the scene by using a special effect such as fade-out or fade-in, information about the way the representing is performed may be also included. When the UI objects are not fixed and instead, are applied by using a moving animation effect, such information may also be included.

The adaptation utility 226 includes information for dynamically configuring the UI based on characteristics of the client 110. The client 110 compares the characteristics of the client 110 with the information included in the adaptation utility 226 and dynamically configures the UI. Also, information for selecting UI elements based on an age of the user, for example users in their twenties, thirties, and forties, may be included. In other words, the adaptation utility 226 may include information indicating that the UI element #1 210 includes information about the UI used by users in their twenties and allows the client of the users in their twenties to display the UI according to the UI element #1 210.

In addition, the scene description 222 may be dynamically changed according to the adaptation utility 226. According to the characteristics of the client 110 (FIG. 1), for example, a size, a font of the UI, a color of the UI object, etc. may be changed. The server 120 (FIG. 1) pre-determines how the UI is changed according to the characteristics of the client 110 (FIG. 1) and information about the determination is included in the adaptation utility 226.

In addition, information for selecting some of the objects from among the plurality of UI objects included in the UI element #1 210, in consideration of the characteristics of the client 110 (FIG. 1), may be included in the adaptation utility 226.

For example, information about object selection for displaying all UI objects A, B, C, and D in the client used by users aged in their twenties, displaying the UI objects A, B, and C in the client used by users aged in their thirties, and displaying UI objects A and B in the client used by users aged in their forties, may be included in the adaptation utility 226.

For dynamic configuration of the UI, the adaptation utility 226 may include information about a scene tree which is described in more detail with reference to FIG. 3.

Figure 3:
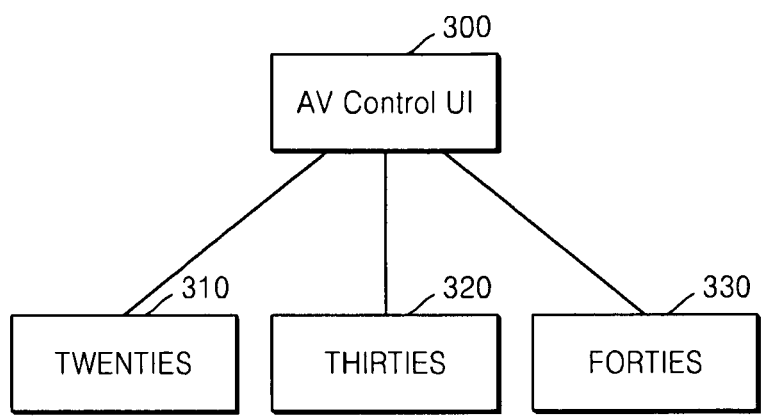
FIG. 3 illustrates a scene tree according to an embodiment of the present invention.

FIG. 3 illustrates a scene tree according to an embodiment of the present invention.

A UI 300 for controlling the same AV may include UIs 310, 320, and 330 for users aged in their twenties, thirties, and forties, respectively. The server 120 (FIG. 1) includes the information about the scene tree to the adaptation utility 226 (FIG. 2) and generates UI data. The client 110 (FIG. 1) refers to the scene tree so as to select one of the plurality of UI elements, dynamically change the scene description 222 (FIG. 2), or select some of the plurality of UI objects.

Referring back to FIG. 2, a resource 228 includes sources for representing UI objects, for example, multimedia data such as images, moving picture files, and audio.

The event information 230 includes information about the events generated by the objects included in the UI scene. Information about the events generated as a result of interaction between the UI objects and the user, such as objects selection by the user, is included.

An event description 232 includes information about the events generated by the objects. A kind of user interaction, which can be performed through UI objects such as click, touch, and rotation, will now be described.

An event handle 234 includes information about a way of processing the generated events. For example, when the event called click is defined in the event description 232, the event handle 234 includes information indicating how the event called click is processed. If the clicked UI object is an object for controlling volume, information for processing the event called click by interpreting the event as volume up or volume down is included.

A binding interface 236 includes information about mapping between the defined events and device application programming interfaces (API) called to process the events, that is, information about mapping between the events and called device API, in order to make a connection between the events generated by UI objects and functions called by the events.

The function information 240 about functions called for processing the events includes detailed information about the device APIs called to perform the functions.

A function description 242 includes information about the detailed operation of the device APIs called by the events, in other words, the functions realized by the user through the device API. For example, when the device API for a vibration function is called, information about a detailed function such as controlling intensity and time of vibration is included.

A function call 244 includes information about parameters of functions called by the UI objects. For example, if it is described in the function description 242 that the device APIs for the vibration function control vibration intensity and the vibration time at levels 1 to 5, the function call 244 includes specific parameters indicating in what level the function should be called from among five levels of the vibration intensity and the vibration time, when a predetermined event is generated. In other words, when the vibration function is called by a UI object A at the vibration intensity of level 3 and at the vibration time of level 1 from among five levels of vibration intensity and vibration time, specific parameters for calling such a function may be included in the function call 244.

Referring back to FIG. 1, in operation 132, the client 110 generates a personalized UI. In other words, the personalized UI to be displayed to the user is generated based on the UI received in operation 130 and the characteristics of the client 110.

The client 110 may compare the characteristics of the client 110 and information about the dynamic configuration of the UI and generate the personalized UI 132.

The client 110 may analyze information about the dynamic configuration of the UI and obtain information about the configuration of the UI which corresponds to the characteristics of the client 110. The characteristics of the client 110 and the adaptation utility 226 (FIG. 2) are compared to each other so as to select the UI element suitable for the characteristics of the client 110 or to change the scene description 222 (FIG. 2) to be suitable for the characteristics of the client 110.

The objects to be included in the UI that is to be displayed may be selected according to the characteristics of the client 110. Here, the objects may be selected with reference to the adaptation utility 226 (FIG. 2) or the client 110 may voluntarily select the UI objects only in consideration of the characteristics of the client 110.

The characteristics of the client 110 may include at least one of performance qualities of the client 110, a user profile of the client 110, a network type to which the client 110 is connected, and external information.

Performance qualities of the client 110 may include hardware performance of the client 110 such as a CPU of the client 110, a memory, a display resolution, and battery power remaining. A hardware resource which can be allocated by the client 110 for displaying a UI, for example, allocable CPU processing capacity and allocable spare memory, may also be included in the performance qualities of the client 110.

The user profile of the client 110 includes user preferences. The user preferences which may be different in each client may be reflected in the displaying of the UI. A standard for determining such preferences includes age, gender, and language of the user. The user preference may be represented by a standard such as MPEG-21 UED (Usage Environment Description) or W3C CC/PP (Composite Capabilities/Preference Profile).

The network type, to which the client 110 is connected, includes ADSL, VDSL, WLAN, and Wi-Fi. According to the network type, to which the client 110 is connected, bandwidth used in displaying the UI by the client 110 may vary and thus, the network type may be the base for generating a personalized UI.

The external information is used to generate a personalized UI and may include information relating to weather, stock, time, and season. According to the information relating to weather, stock, time, and season, the UI needed for the user may vary and thus, the UI may be dynamically displayed. When the client 110 has a function of operating the UI by using motion sensing, such a function is also included in the external information. The external information may be received from an external server, instead of the client 110, for example, servers for providing weather information or stock information.

In operation 134, the client 110 displays the personalized UI generated in operation 132 to the user.

In operation 136, the client 110 controls the server 120 using the displayed UI. According to the user input based on the displayed UI, a predetermined event is called to the server 120 or a predetermined control message is transmitted to the server 120.

The client 110 may generate the personalized UI according to the characteristics of the client 110 in operations 130 through 136 so that use of the client 110 by the user may be improved. Also, the server 120 may be controlled more efficiently by using the personalized UI.

Figure 4:
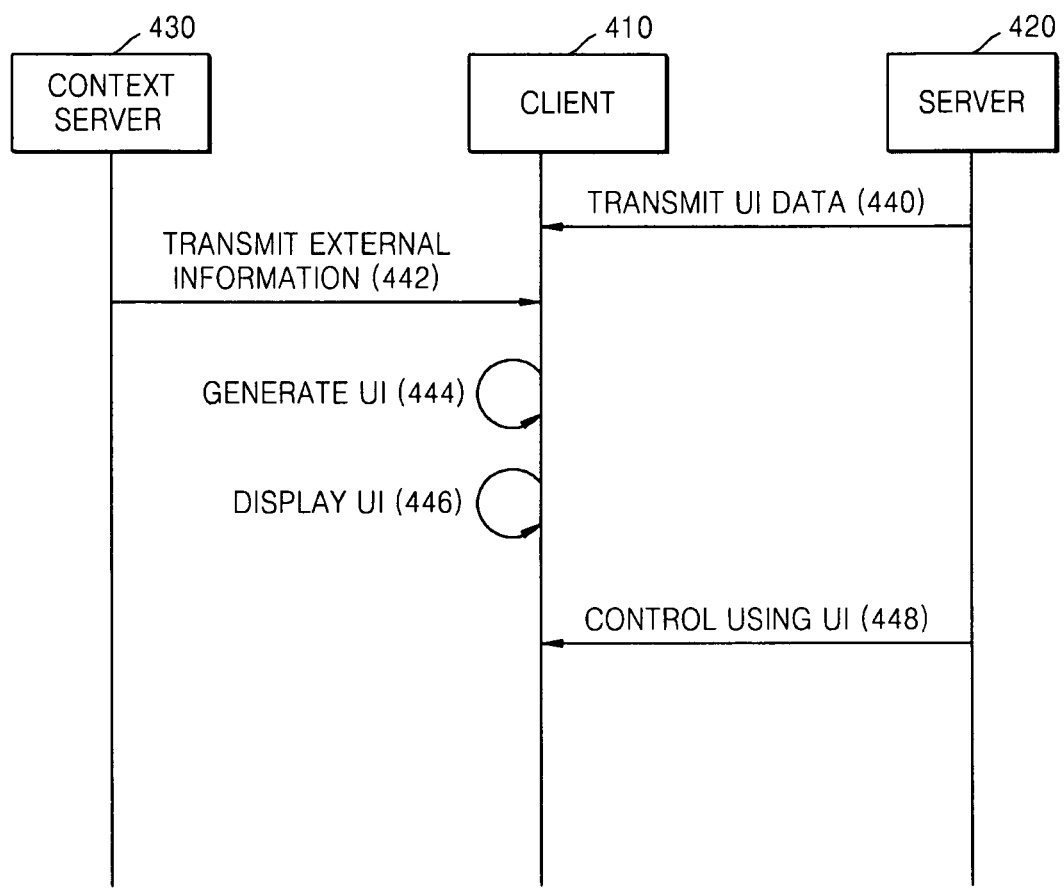
FIG. 4 illustrates a data flow diagram of a method of displaying a UI according to another embodiment of the present invention.

FIG. 4 illustrates a data flow diagram of a method of displaying a UI according to an embodiment of the present invention.

Similarly to FIG. 1, a client 410 in FIG. 4 is a UI client which displays the UI, the UI receiving UI data from a server 420, which is a remote UI server. A difference between FIG. 4 and FIG. 1 is that the external information is received from a separate context server 430 and the received external information is reflected in the generation of the UI.

Operation 440 may correspond to operation 130 in FIG. 1. In operation 440, the server 420 transmits the UI data to the client 410.

The UI data provided from the server 420 to the client 410 may be data encoded in a multimedia data format according to a Moving Picture Experts Group (MPEG) standard, in particular, a scene-description technology according to the MPEG standard. Also, the UI data may be data encoded in a UI package format using a scene-description technology according to the MPEG standard as illustrated in FIG. 2, for example.

In operation 442, the context server 430 transmits the external information to the client 410. For example, information about weather and stock is provided to the client 410. Based on not only a use environment of the client 410 such as weather, season, and temperature but also the external information such as stock fluctuations, the UI may be personalized.

Thus, in order to generate the UI by reflecting the external information, the context server 430 provides predetermined external information to the client 410, in operation 442.

In operation 444, the client 410 generates the personalized UI. In other words, the UI personalized based on the external information received in operation 442 is generated. As described with reference to FIGS. 1 and 2, the external information and the adaptation utility 226 may be compared to each other so as to select a predetermined UI element or the scene description 222 may be changed according to the external information. The objects to be included in the UI that is to be displayed may be selected according to the external information.

For example, in cloudy weather, the UI element formed of a color and font suitable for the cloudy weather is selected or the scene description 222 is changed to a color and font suitable for the cloudy weather, thereby generating the UI.

In operation 446, the client 410 displays the UI generated in operation 444 to the user.

In operation 448, the client 110 controls the server 420 by using the displayed UI.

In FIG. 4, generating of the personalized UI based on the UI data received from the server 420 is illustrated. However, generating of the personalized UI based on the external information is not limited thereto and the UI previously displayed by the client 410 may be changed based on the external information and displayed to the user, in addition to the UI received from the server 420. For example, a color and font of the UI displayed by the client 410 may be changed based on the information about weather or stock and displayed to the user.

Figure 5:
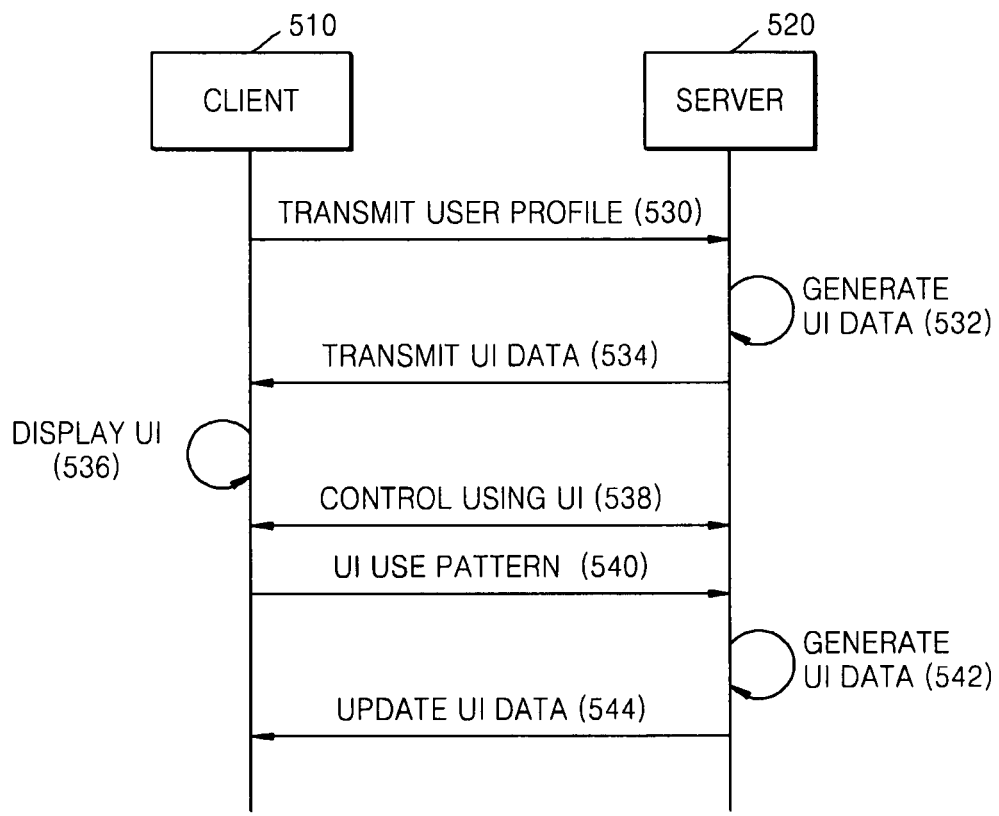
FIG. 5 illustrates a data flow diagram of a method of displaying a UI according to another embodiment of the present invention.

FIG. 5 illustrates a data flow diagram of a method of displaying a UI according to another embodiment of the present invention.

Similarly to FIG. 1, a client 510 in FIG. 5 is a UI client which displays the UI, the UI receiving UI data from a server 520, which is a remote UI server. A difference between FIG. 5 and FIG. 1 is that the client 110 generates the UI in FIG. 1, whereas the server 520 generates the UI based on the user profile of the client 510 in FIG. 5.

In operation 530, the client 510 transmits the user profile to the server 520. As described above, the user profile may include a user preference. A standard for determining such a preference includes age, gender, and language of the user. The user preference may be represented by a standard such as the MPEG-21 UED (Usage Environment Description) or the W3C CC/PP (Composite Capabilities/Preference Profile).

In operation 532, the sever 520 generates the UI data based on the user profile received in operation 530. In other words, the UI is generated based on user preferences of the client 510 received in operation 530. According to the MPEG standard, the UI may be encoded in a multimedia data format and the UI data may be generated.

In operation 534, the UI data is transmitted to the client 510. A MPEG-stream generated according to the MPEG standard is streamed to the client 510.

In operation 536, the client 510 displays the UI received in operation 534 to the user. The MPEG-stream is decoded and displayed to the user in real-time.

In operation 538, the client 510 controls the server 520 using the displayed UI.

In operation 540, the client 510 transmits a use pattern to the server 520. In other words, the client 510 analyzes a pattern of controlling the UI performed by the user, in operation 538, and transmits the analyzed information to the server 520. There may be a particular type of UI object preferred by the user. In addition, there may be a particular type of content preferred by the user. Thus, if the user pattern of the UI is analyzed, the user preference may be known. The client 510 transmits the information about the use pattern to the server 520 and allows the server 520 to update the UI by considering the preference of the client 510.

In operation 542, the server 520 generates new UI data based on the use pattern of the UI received in operation 540.

In operation 544, the server 520 transmits the UI data generated in operation 542 to the client 510. In other words, the UI data generated from the use pattern of the user of the client 510, which was received in operation 540, is transmitted to the client 510.

Figure 6:
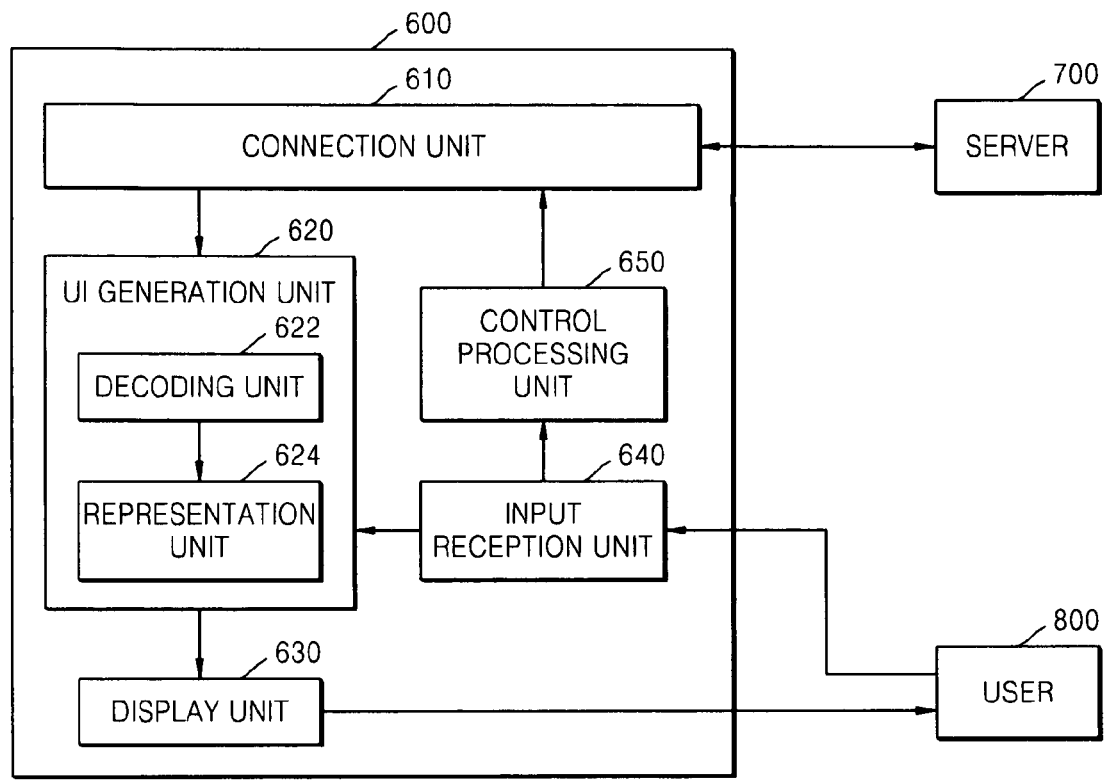
FIG. 6 illustrates a block diagram of a client according to an embodiment of the present invention.

FIG. 6 illustrates a block diagram of a client 600 according to an embodiment of the present invention.

Referring to FIG. 6, the client 600 may include a connection unit 610, a UI generation unit 620, a display unit 630, an input reception unit 640, and a control processing unit 650.

The connection unit 610 receives UI data from a server 700, wherein the UI data is encoded in a multimedia data format using a scene-description technology based on the MPEG standard. As similarly illustrated in FIG. 5, the connection unit 610 first transmits the user profile to the server 700 and in response to this, personalized UI data may be received.

The UI generation unit 620 decodes the UI data received from the connection unit 610 and generates the UI. A decoding unit 622 decodes the UI data by using a MPEG decoder. The decoded UI is personalized by a representation unit 624 based on the characteristics of the client 600. The decoded UI is personalized with reference to the characteristics of the client 600 and information about the dynamic configuration of the UI included in the UI data. The characteristics of the client 600 used in personalizing the UI includes performance of the client 600, a user profile of the client 600, a network type to which the client 600 is connected, and external information.

The display unit 630 displays the personalized UI generated by the UI generation unit 620 to a user 800.

The input reception unit 640 receives a user input according to the UI displayed in the display unit 630.

The control processing unit 650 calls a predetermined event through the connection unit 610 or generates and transmits a control message, in order to perform a control operation according to the user input.

Figure 7:
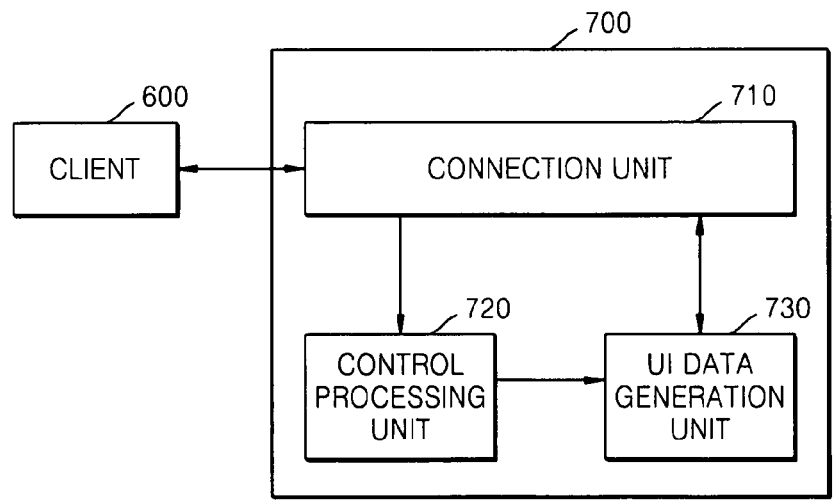
FIG. 7 illustrates a block diagram of a server according to an embodiment of the present invention.

FIG. 7 illustrates a block diagram of server 700 according to an embodiment of the present invention.

Referring to FIG. 7, the server 700 includes a connection unit 710, a control processing unit 720, and a UI data generation unit 730.

The connection unit 710 transmits the UI data to the client 600, wherein the UI data is encoded in a multimedia data format using a scene-description technology based on the MPEG standard. As similarly illustrated in FIG. 5, the connection unit 710 first receives the user profile from the client 600 and in response to this, personalized UI data may be transmitted.

The control processing unit 720 performs a control operation based on a message for calling the event received from the connection unit 710 or a control message. As a result of performing the control operation, when the UI needs to be updated, the UI data generation unit 730 is controlled and new UI data is generated.

The UI data generation unit 730 encodes the UI data, wherein the UI data is encoded in a multimedia data format using a scene-description technology based on the MPEG standard. Information needed to dynamically configure the UI may be included in the UI data. When the connection unit 710 receives the user profile of the client 600 before transmitting the UI data, the UI data is generated based on this.

According to embodiments of the present invention, since the client only considers the characteristics of the client such as user preferences, the client generates a personalized UI by itself and displays the personalized UI. Thus, user satisfaction when using the client can be improved.

The invention can also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. For example, an method of displaying and providing a user interface can be performed by using a computer, mobile phone, set-top box, portable media player, digital television, digital camera, camcorder and DVD player which can represent UI based on MPEG decoder. And, an apparatus for displaying a user interface and an apparatus for providing a user interface according to an exemplary embodiment of the present invention can comprise a bus coupling each unit of the apparatus as shown in FIGS. 6 and 7, at least one processor coupled to the bus, a memory coupled to the bus to store instructions, received message or generated message, and to the at least one processor to execute instructions as described earlier.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of displaying a user interface (UI), wherein the displaying is performed by a client, the method comprising:
  receiving UI data encoded in a multimedia data format from a server;
  decoding the received UI data including a plurality of UI elements which include information needed to select one of the plurality of UI elements, each of the plurality of UI elements includes presentation information for representing objects included in the UI, and information about mapping, different in at least two UI elements of the plurality of UI elements, between device application programming interfaces and events generated by the objects;
  generating the UI based on a UI element selected based on characteristics of a user preference and the information needed to select one of the plurality of UI elements; and
  displaying the generated UI in which objects corresponding to the selected UI element are represented.

2. The method of claim 1, wherein the UI data is encoded in the multimedia data format using a scene-description technology based on a Moving Picture Experts Group (MPEG) standard.

3. The method of claim 2, wherein the UI data comprises information about a dynamic configuration of the UI.

4. The method of claim 3, wherein the generating of the UI comprises comparing the characteristics of the user preference against the information about the dynamic configuration of the UI.

5. The method of claim 3, wherein the information about the dynamic configuration of the UI is used in the generating of the UI by changing at least one of a color, a form, a background image, and a font of the UI.

6. The method of claim 3, wherein the UI data comprises data for a plurality of UI objects.

7. A non-transitory computer readable recording medium having embodied thereon a computer program for causing a computer to execute the method of claim 1.

8. A method of providing a user interface (UI) from a server to a client, the method comprising:
   encoding, in a multimedia data format, UI data including a plurality of UI elements which include information needed to select one of the plurality of UI elements, each of the plurality of UI elements includes presentation information for representing objects included in the UI, and information about mapping, different in at least two UI elements of the plurality of UI elements, between device application programming interfaces and events generated by the objects; and
   transmitting the encoded UI data to the client,
   wherein the client decodes the transmitted UI data and generates the UI based on a UI element selected based on characteristics of a user preference
   and the information needed to select one of the plurality of the UI elements.

9. A non-transitory computer readable recording medium having embodied thereon a computer program for causing a computer to execute the method of claim 8.

10. The method of claim 8, wherein the UI data is encoded in the multimedia data format using a scene-description technology based on a Moving Picture Experts Group (MPEG) standard.

11. The method of claim 8, wherein the UI data comprises information about a dynamic configuration of the UI, which is used in the generating of the UI by changing at least one of a color, a form, a background image, and a font of the UI.

12. The method of claim 8, wherein each of the plurality of UI elements is a minimum unit of the UI in which a predetermined event is generated from interaction with a user.

13. An apparatus for displaying a user interface (UI) of a client, the apparatus comprising:
   a connection unit receiving UI data encoded in a multimedia data format from a server;
   a UI generation unit decoding the received UI data including a plurality of UI elements which include information needed to select one of the plurality of UI elements, each of the plurality of UI elements includes presentation information for representing objects included in the UI and information about mapping, different in at least two UI elements of the plurality of UI elements, between device application programming interfaces and events generated by the objects, and generating the UI to be displayed based on a UI element selected based on characteristics of a user preference and the information needed to select one of the plurality of UI elements; and
   a display unit displaying the generated UI in which objects corresponding to the selected UI element are represented.

14. The apparatus of claim 13, wherein the UI data is encoded in the multimedia data format using a scene-description technology based on a Moving Picture Experts Group (MPEG) standard.

15. The apparatus of claim 13, wherein the UI data comprises information about a dynamic configuration of the UI.

16. An apparatus for providing a user interface (UI) to a client of a server, the apparatus comprising:
   a UI data generation unit encoding, in a multimedia data format, UI data including a plurality of UI elements which include information needed to select one of the plurality of UI elements, each of the plurality of UI elements includes presentation information for representing objects included in the UI, and information about mapping, different in at least two UI elements of the plurality of UI elements, between device application programming interfaces and events generated by the objects; and
   a connection unit transmitting the encoded UI data to the client,
   wherein the client decodes the transmitted UI data and generates the UI based on a UI element selected based on characteristics of a user preference
   and the information needed to select one of the plurality of UI elements.

17. The apparatus of claim 16, wherein the UI data is encoded in the multimedia data format using a scene-description technology based on a Moving Picture Experts Group (MPEG) standard.

18. The apparatus of claim 17, wherein the UI data comprises information about a dynamic configuration of the UI.

* * * * *